United States Patent Office 3,126,128
Patented Mar. 24, 1964

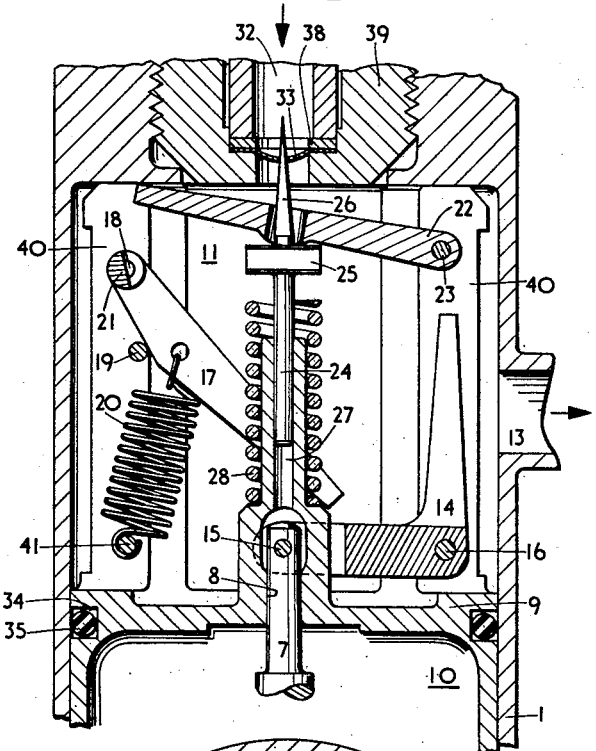
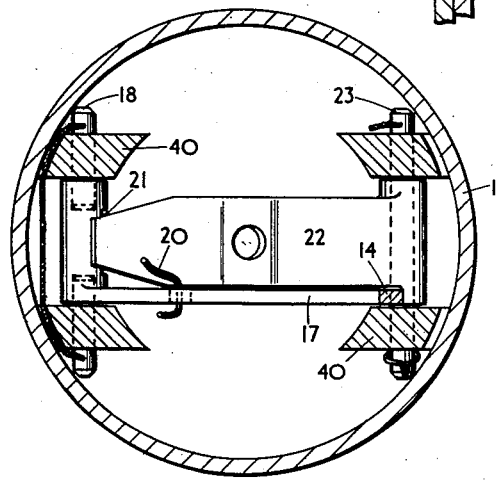

3,126,128
GAS PRESSURE RELEASE DEVICE
Nathaniel Borsack, Hackney, London, and Henry L. Horner, Yeovil, England, assignors to Normalair, Ltd., Yeovil, England, a corporation of England
Filed Nov. 27, 1959, Ser. No. 855,686
Claims priority, application Great Britain Dec. 2, 1958
9 Claims. (Cl. 222—5)

This invention relates to a gas release device and more particularly to a device which is well suited to increase the pressure within a pressure suit upon substantial decrease in the ambient air pressure.

Heretofore, there have been provided means for automatically increasing the air pressure in a pressure garment upon a sudden decrease in the ambient atmospheric pressure. Such a pressure drop could be caused by the fuselage of the aircraft becoming damaged and under such circumstances it is essential that the pressure within the garment be increased practically instantaneously. The means utilized to perform this function generally comprised a mechanism connected to the oxygen supply system between the oxygen regulator and the breather's mask. Unfortunately, it has been found that under certain circumstances the oxygen regulator cannot supply oxygen at a rate necessary to inflate the pressure garment in a desired period of time.

According to the present invention there is provided a system which is independent of the oxygen supply system and the breathing mask. There is provided a container having a pair of compartments therein. In one of these compartments is disposed a sealed bellows which is exposed to the ambient atmosphere. The other compartment is provided with an outlet port which may be connected with the pressure suit and an inlet port which is connected with a gas pressure source. This inlet port is covered by a frangible plate and this plate is adapted to be pierced by a member having a piercing point disposed within the compartmented container. Linkage mechanism interconnects the member with one end of the bellows so that upon decrease of the pressure in the ambient atmosphere, the bellows expands, thus moving the linkage and causing the member to pierce the frangible plate. When this occurs the gas pressure is released and inflates the pressure garment. The presently disclosed system provides a simple, efficient system for insuring that the pressure suit will be inflated at the proper time irrespective of the conditions existing in the oxygen supply system.

It is an object of the present invention to provide a mechanism for inflating a pressure garment in response to changes in pressure in the ambient atmosphere.

It is another object of the present invention to provide a gas release device for inflating a pressure suit which operates independently of the oxygen breathing system.

Other objects and many of the attendant advantages of the present invention will become apparent upon consideration of the following detailed specification in connection with the accompanying drawings wherein:

FIG. 2 is a partial sectional view showing the parts in the released position; and FIG. 3 is a transverse section through the device on the line III—III of FIG. 1.

Figure 1:
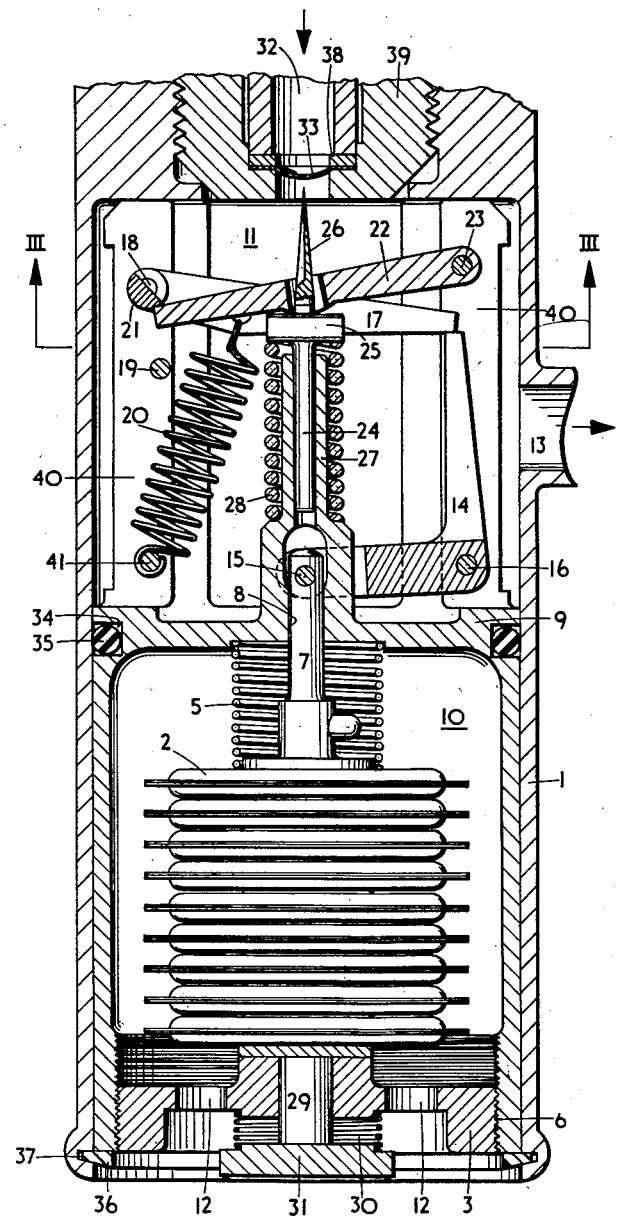
FIG. 1 is an elevational view in section showing the parts in their normal unreleased position.

Referring now more specifically to the drawings wherein like numerals indicate like parts throughout the several views there is shown at 1 a container having a port formed in one end thereof and having the opposite end open. A cup-shaped member 9 is received within the container 1 and this member is provided with an O-ring seal 35 received within a recess 34. A split-ring retainer 36 is received within a groove 37 in the container 1 and this split-ring retains the member 9 securely within the container. It can be seen that the member 9 divides the interior of the container 1 into two compartments 10 and 11. These compartments are completely sealed from one another by virtue of the O-ring seal.

It will be seen from FIG. 1 that latch mechanism is so constructed that in the retracted or cocked position the force of extending spring 28 is held by pivots 18 and 23. It will also be apparent that as the end of latch 22 is catched directly below the center of pivot 18 the spring force acting on cam 21 is frictional only. Because of this arrangement the only force acting on trigger lever 17 is that of spring 20 urging lever 17 into contact with the end of bell crank lever 14. Consequently, a very sensitive trigger mechanism even where large extending spring forces are used can be achieved. In addition the strength of the extending spring may be altered without affecting the sensitivity of the trigger mechanism.

A cap member 3 is secured as by screw threads 6 within cup-shaped member 9. This cap is provided with ports 12 which provide a communicating passageway between compartment 10 and the ambient atmosphere. Extending through the central aperture in the cap 3 is a plunger element 29 having a knob 31 disposed on one end thereof. The plunger is maintained in the position shown in FIG. 1 by spring 30. This plunger may be forced inwardly of the compartment 10 for a purpose which will become more clear hereinafter.

The inner face of the plunger is engageable with a bellows 2. This bellows is completely sealed and is preloaded to maintain the position shown at atmospheric pressure when stressed by spring 5. A rod 7 extends through a bore 8 in the member 9 and the outer end of this rod is pivoted as at 15 to the shorter arm of a bell crank lever 14. This bell crank lever is pivoted as at 16 within the compartment 11. There is provided a lever 17 which is pivoted as at 18 within the compartment 11. The end of this lever remote from the pivot rests on the end of bell crank lever 14 and is urged to this position by spring 20 having its end remote from lever 17 attached to a pin 41 on frame 40. Pivots 16, 18 and 23 and the stop 19 are also located on the frame 40 which is fixed to and withdrawn with the cup-shaped member 9 when desired. The end of lever 17 adjacent the pivot is provided with a cam 21 which cooperates with a latch 22 pivoted within compartment 11 as at 23.

Another feature of the device is that after actuation it is a relatively simple matter to remove retaining clip 36 and withdraw the mechanism from the container 1 for recocking and/or servicing.

Slidably disposed within a bore 27 is member 24. This member 24 is provided with a shoulder 25 and a piercing point 26 and is urged to an extended or released position by spring 28. In the position shown in FIG. 1, however, the shoulder 25 engages the latch 22 so that the member is retained in the retracted position.

Seated within the bore in the end of container 1 is a chamfered adaptor 39 which is adapted to receive the nozzle of a pressure source 32. A frangible cap 33 located by a washer 38 closes the gas pressure source and prevents its content from escaping into the compartment 11. The port 13 in the container 1 provides a means for connecting the disclosed device with a pressure suit. The device operates in the following manner.

At normal air pressures the bellows 2 maintains the position show and the gas pressure within pressure source 32 is not released to the pressure garment. However, upon substantial decrease in the ambient pressures such as would result from rupture of the aircraft fuselage, the bellows will expand causing the rod 7 to move upwardly as viewed in FIG. 1 and cause the bell crank lever to move clockwise. The lever 17 is thereby released and the spring 20 pulls the lever into contact with a stop element 19. The rotational movement of lever 17 will release latch 22 so that spring 28 forces the member 24 to pierce frangible element 33. The elements thus assume the position shown in FIG. 2 and the gas pressure within source 32 inflates the pressure suit through port 13.

The knob 31 serves as a manual means for actuating the member 24 by forcing the knob 31 and plunger 29 inwardly, so shifting the rod 7 within the bore 8 to produce the same results.

It can thus be seen that there is provided an efficient and yet simple structure for achieving the desired result. The mechanism does not depend upon the oxygen system for the breathing mask and is, therefore, free of the disadvantages of systems used heretofore. Obviously, many modifications and variations of the present invention are possible in light of the above teachings. What is claimed as new and desired to be secured by Letters Patent is:

1. A gas release device in conjunction with a pressure source provided with a frangible cap comprising a cutaway piercing point adapted to pierce said cap, an extending spring co-acting with said point and housed within a container having inlet and exhaust ports and provided with a cup shaped insert below said ports, the inside of said insert forming a chamber for an actuation device, and the outside of the base of said insert forming a platform provided with a centrally disposed hollow boss and a mounting frame, said hollow boss forming a location for said extending spring and a guide for a member carrying said piercing point, a rod passing through the base of said insert into said hollow boss pivotally connecting said actuation device to one arm of a bell crank having its pivot at a point on said frame in line with the base of said boss, the other arm of said bell crank extending longitudinally within said container to a point almost in line with the end of said boss, a latch member defining an aperture which surrounds said piercing point having its pivot at a point on said frame in line with the end of said other arm of said bell crank and extending transversely so that when the extending spring is compressed it can be latched beneath a cam integral with the pivoted end of a lever member extending transversely to meet the end of said other arm for support thereby, the pivots of said bell crank, said latch member and said lever member forming an angle approaching that of a right angle.

2. A gas pressure release device as claimed in claim 1 wherein when said device is cocked, said extending spring is compressed by said latch member and held in position by said cam so that the force of said extending spring acts through the pivots of said lever member and said latch member without any moment on said lever member.

3. A gas pressure release device as claimed in claim 1 wherein when said device is cocked, said lever member is urged into contact with said bell crank by spring means.

4. A gas pressure release device as claimed in claim 1 wherein the force of said extending spring may be varied without affecting the contact pressure of said lever member with said bell crank.

5. A gas pressure release device as claimed in claim 1 wherein said actuation device is a bellows.

6. A gas pressure release device as claimed in claim 1 wherein said actuation device is said rod.

7. A gas pressure release device as claimed in claim 1 wherein said cup shaped insert is removed from said container together with said actuation device and said mounting frame for the purpose of servicing and recocking the device.

8. A device for increasing the pressure in a pressure suit in response to a drop in pressure in the ambient atmosphere comprising, in combination, a container, divided into two compartments by a removable cup shaped member, a sealed bellows exposed to the ambient air pressure disposed within said member, a rod engaging one end of the bellows and extending through the base of said member to a hollow boss within the other compartment, said other compartment, provided with an inlet and outlet port, a bell crank having one arm extending through the side of said hollow boss pivotally connected to said rod, a lever member having a cam integral with its pivot end, its free end engageable with the free end of said bell crank, and spring means urging said lever member into contact with said bell crank when in the engaged position, a latch member having a pivot opposite said cam, the end of said latch member engageable with said cam, and the mid portion of said latch member in contact with a spring loaded piercing member, said piercing member being slidably mounted within said hollow boss, in line with the frangible cap of a pressure source, said spring loading urging said piercing member to a released position, said piercing member being retained in an inoperative position by engagement of said latch member with said cam and said cam lever member with said bell crank.

9. A device as claimed in claim 8 wherein upon expansion of said sealed bellows, said bell crank is urged out of contact with said lever member, said lever member rotating said cam to release said latch member allowing said piercing member to pierce said cap and release said gas through said ports.

References Cited in the file of this patent

UNITED STATES PATENTS

| | | |
|---|---|---|
| 1,329,990 | Muller | Feb. 3, 1920 |
| 1,671,369 | Johann | May 29, 1928 |
| 1,926,069 | Sutton | Sept. 12, 1933 |
| 1,933,694 | Allen et al. | Nov. 7, 1933 |
| 2,697,538 | Seeler | Dec. 21, 1954 |
| 2,703,572 | Seeler | Mar. 8, 1955 |
| 2,707,605 | Sieverts | May 3, 1955 |
| 2,892,456 | Seeler | June 30, 1959 |
| 2,946,484 | Stoner | July 26, 1960 |

FOREIGN PATENTS

| | | |
|---|---|---|
| 690,245 | France | June 16, 1930 |
| 782,331 | France | Mar. 11, 1935 |